United States Patent
Lee

(10) Patent No.: US 10,680,835 B2
(45) Date of Patent: *Jun. 9, 2020

(54) SECURE AUTHENTICATION OF REMOTE EQUIPMENT

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,543

(22) Filed: May 14, 2018

(65) Prior Publication Data

US 2018/0262352 A1   Sep. 13, 2018

Related U.S. Application Data

(63) Continuation of application No. 14/640,745, filed on Mar. 6, 2015, now Pat. No. 9,998,287.

(51) Int. Cl.
*H04L 9/32* (2006.01)
*H04L 29/06* (2006.01)
*H04L 9/06* (2006.01)

(52) U.S. Cl.
CPC .......... *H04L 9/3271* (2013.01); *H04L 9/0643* (2013.01); *H04L 9/321* (2013.01); *H04L 9/3263* (2013.01); *H04L 9/3297* (2013.01); *H04L 63/0281* (2013.01); *H04L 63/0823* (2013.01)

(58) Field of Classification Search
CPC ..... H04L 9/3271; H04L 9/0643; H04L 9/321; H04L 9/3297; H04L 63/0281; H04L 9/3263; H04L 63/0823
See application file for complete search history.

(56) References Cited

U.S. PATENT DOCUMENTS

| | | | |
|---|---|---|---|
| 6,990,578 B1 * | 1/2006 | O'Brien | H04L 63/0428 705/51 |
| 2002/0037736 A1 * | 3/2002 | Kawaguchi | H04W 4/08 455/518 |
| 2003/0045273 A1 * | 3/2003 | Pyhalammi | H04L 12/14 455/412.1 |
| 2004/0083494 A1 * | 4/2004 | Sakurai | G06Q 20/02 725/126 |

(Continued)

*Primary Examiner* — Meng Li
(74) *Attorney, Agent, or Firm* — BakerHostetler

(57) ABSTRACT

An authentication server may use secure messaging with a remote device prior to authorizing non-secure communications between the remote device and a content server, thereby preventing unauthorized access to the content server. The secure messaging uses such security features as encryption, signatures with authentication certificates, a realm, and/or a nonce. Once non-secure communication is authorized, the remote device may act as a proxy between the content server and a user device connected to the remote device. The authentication server sends timeout notices to the remote device containing an interval and a key. To continue non-secure communications with the content server, the remote device must respond prior to the expiration of the interval by sending a keep-alive message containing the key to the authentication server.

20 Claims, 6 Drawing Sheets

(56) References Cited

U.S. PATENT DOCUMENTS

| | | | |
|---|---|---|---|
| 2004/0205201 A1* | 10/2004 | Katsube | H04L 41/0803 709/229 |
| 2007/0203990 A1* | 8/2007 | Townsley | H04L 9/3271 709/206 |
| 2007/0204330 A1* | 8/2007 | Townsley | H04L 9/3271 726/4 |
| 2008/0212778 A1* | 9/2008 | Kaneko | H04L 9/083 380/277 |
| 2008/0288773 A1 | 11/2008 | Nguyen et al. | |
| 2010/0088399 A1 | 4/2010 | Gluck | |
| 2010/0250796 A1* | 9/2010 | Jevans | G06F 21/606 710/36 |
| 2011/0314346 A1* | 12/2011 | Vas | H04L 63/06 714/49 |
| 2013/0080769 A1* | 3/2013 | Cha | H04W 12/04031 713/155 |
| 2015/0156058 A1* | 6/2015 | Uefuji | H04L 41/046 709/223 |

* cited by examiner

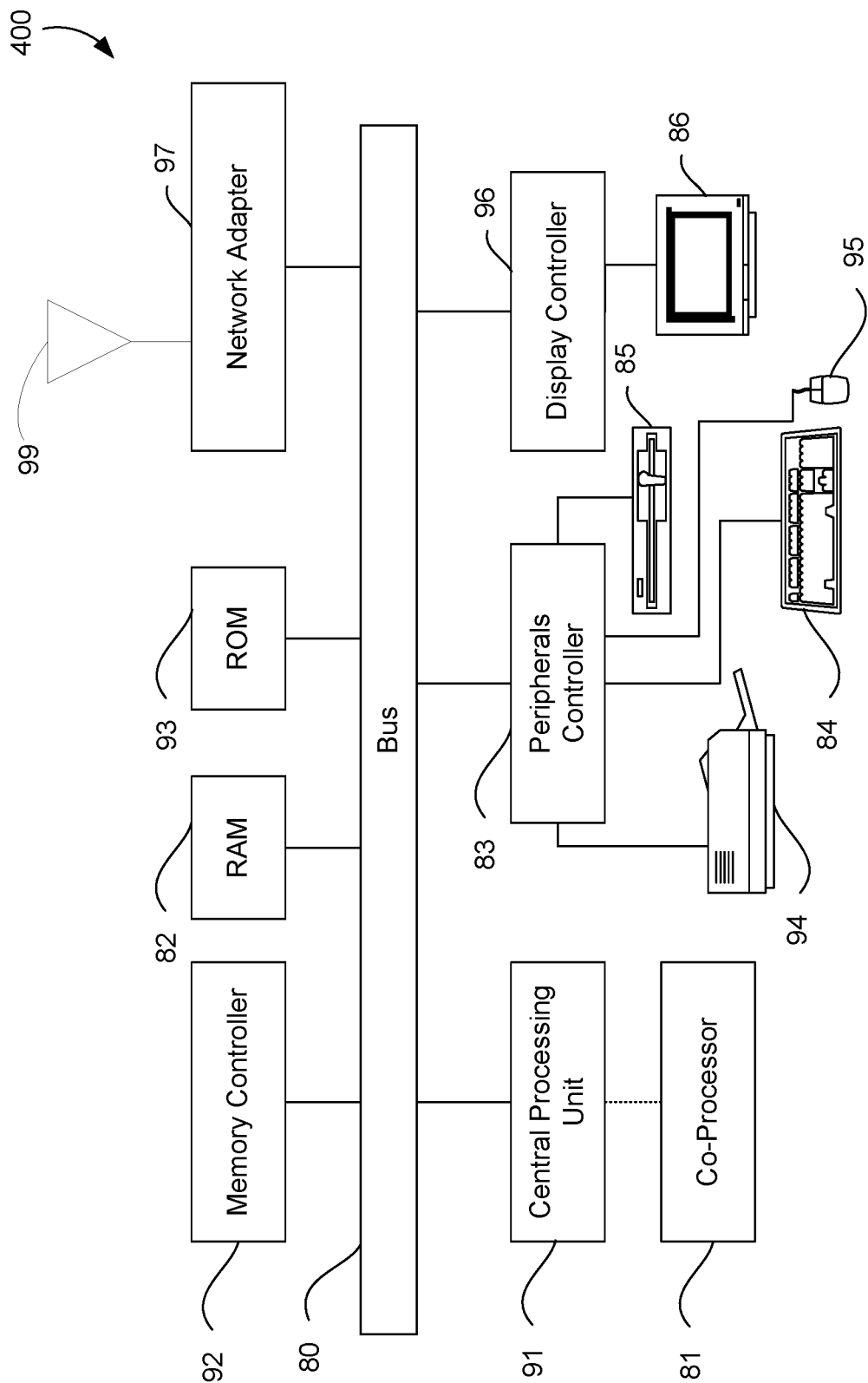

SECURE AUTHENTICATION OF REMOTE EQUIPMENT

CROSS REFERENCE TO RELATED APPLICATIONS

This application is a continuation of U.S. patent application Ser. No. 14/640,745 filed on Mar. 6, 2015, the entire contents of which are incorporated herein by reference.

BACKGROUND

Network gateway devices typically receive requests from a variety of local devices that seek access to remote resources via packet network pathways. For example, a wireless access gateway may receive requests for access to the Internet from local devices such as laptop and tablet computing devices. Access to the remote resources may be restricted by the gateway or by the remote resources by a number of means, such as authentication. For example, a user of a tablet or phone that attempts to access a particular access gateway may need to provide a username and password that must be authenticated prior to gaining access to the gateway and the resources accessible through the gateway. Gateway devices may be used to provide access to all types of networks including, for example, network pathways that are proprietary and generally closed to third-party traffic, as well as non-proprietary pathways that are generally open to third-party traffic. For example, in some instances gateway devices may provide a user with access to a proprietary network maintained by a private entity, while in other instances gateway devices may provide access to a public network such as the Internet.

SUMMARY

Systems and methods are described for authenticating remote equipment. A network device, such as a gateway, may use a secure method for establishing a communication channel with a content server, such as an overlay end point content server. Thereafter the network device may act as a proxy between the content server and a user device connected to the network device for the exchange of non-secure data, e.g., data that is not encrypted and/or not signed with an authentication certificate. The network device may be required to periodically communicate a keep-alive message to an authentication server in order to maintain the communication channel.

In an example embodiment, the network device receives a secure challenge from an authentication server affiliated with the content server. The secure challenge may include a token that is known to the network device and which may comprise a device-based authentication certificate of the authentication server. In response to the challenge, the network device may send a secure response, which may comprise, for example, a device-based authentication certificate of the network device, an internet protocol address, and/or identification information about the user device. The challenge and response may include a realm and nonce. The realm may be created or specified by the authentication server to manage services for multiple regions or sets of client devices. The nonce may be a one-time-use random number used to prevent others from spoofing responses to the challenge. If the authentication server is satisfied with the response to the challenge, it may permit the content server to exchange non-secure data with the user device via the network device. In an example embodiment, the network device may receive a timeout notice from the authentication server. The network device may be required to prepare and transmit a keep-alive message to the authentication server prior to a specified timeout limit in order for the communication channel to be maintained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIG. 6 is a block diagram of a network device or a server.

DETAILED DESCRIPTION

Figure 1:
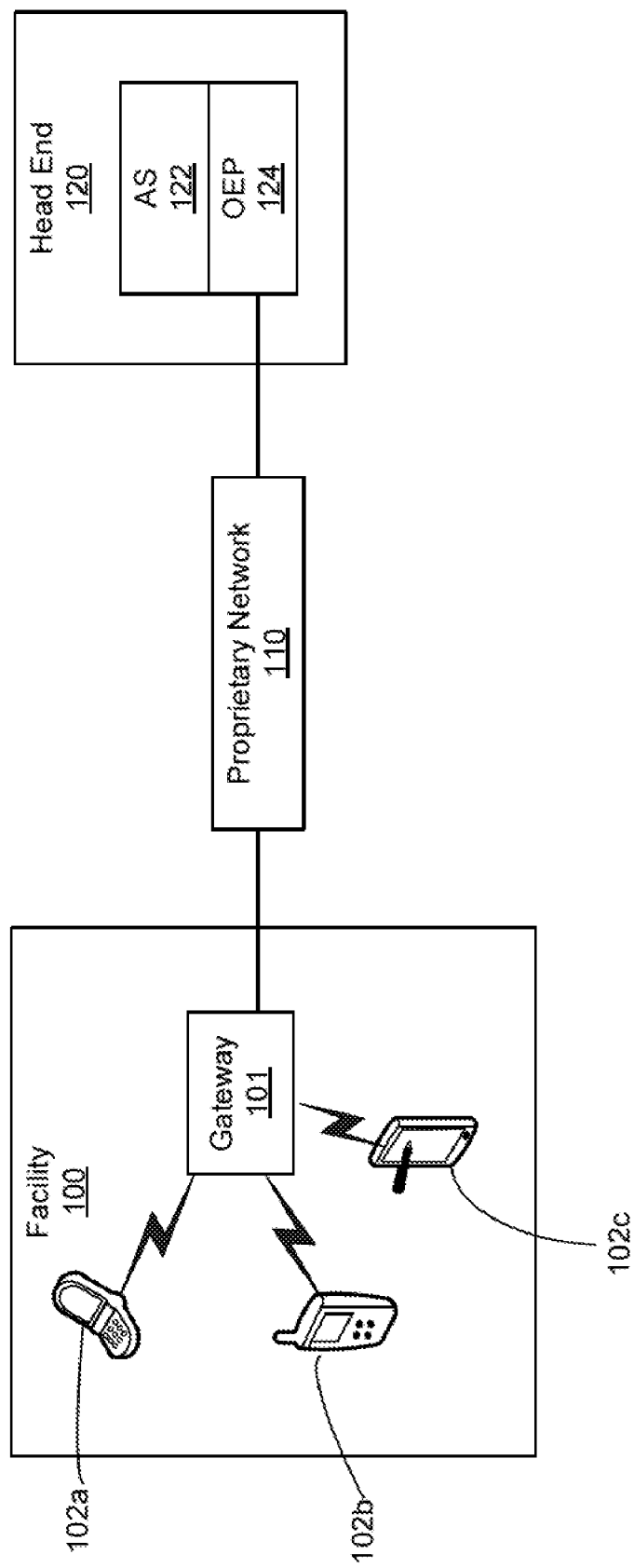
FIG. 1 is a block diagram illustrating an example system using a proprietary network.

Systems and methods are described for authenticating remote devices so as to prevent unauthorized access to network resources. A network device, such as a gateway, may use a secure method to establish a communication channel with a content server, such as an overlay end point content server. Thereafter the network device may act as a proxy between the content server and a user device connected to the network device for the exchange of non-secure data.

Applicant has noted that in some circumstances, the provision of services needs to be secured, but the content of the service does not. For example, a retail facility may wish to provide Internet access via a WiFi connection as a courtesy to its in-store shoppers. The retailer may prefer not to burden its shoppers with having to learn and enter a password in order to access a WiFi gateway located in the store. The retailer may contract to have such Internet access managed by a remote service provider that does not have ready access to, and does not control, the physical retail area. Accordingly, the remote service provider may not be able to control the gateway systems located in the store. Therefore it is possible that unauthorized gateway systems could be installed at the customer's physical location. Similarly, it may be difficult for the service provider to distinguish a legitimate request for services coming from the store for improper requests originating elsewhere on a third-party network that is not under the control of the service provider. The service provider may secure traffic between end user devices and service provider equipment by requiring that a secure tunnel be used between the service provider and any remote systems. However, creating such a secure tunnel adds greatly to processing overhead at the service provider and the remote systems, e.g., by requiring that all content be encrypted and decrypted. Applicant discloses herein methods that provide the requisite security without incurring undue processing overhead.

In an example embodiment, a network device receives a secure challenge from an authentication server affiliated with the content server. A challenge, or any other message, may be secured through the use of encryption, authentication certificates, and/or other tokens or methods. Encryption may include, for example, a cryptographic hash function such as a message-digest algorithm like MD5, or another algorithm such as SHA-1 or SHA-2.

In response to the challenge, the network device may send a secure response, e.g., the response may be encrypted and/or include a number of other security features, such as a device-based authentication certificate of the network device, and other information such as an internet protocol address, and/or identification information about the user device. The challenge and response may include a realm and nonce. If the authentication server is satisfied with the response to the challenge, it may permit the content server to exchange non-secure data, e.g., unencrypted data, with the user device via the network device. The network device may serve as a gateway to a plurality of end-user devices. The services provided to the network device and/or to user devices may be differentiated based on the identity of those devices. For example, the content server may provide limited or "guest" services to unknown devices, more substantial services to known devices, and premium services to devices belonging to registered premier users.

The channel for non-secure data exchange may be maintained by a method that includes the authentication server sending secure timeout notices to the network device, which the network device must answer with secure keep-alive messages. The timeout notice and keep-alive message may include a random number.

Example networks, devices, and methods useful for enabling a network device to securely establish a channel for non-secure communications are described below.

FIG. 1 shows a facility 100 having a variety of end-user equipment wireless devices 102a, 102b, and 102c. For purposes of illustration, devices 102(a-c) are shown as wireless consumer devices, such as cell phones, smart phones, tablet computers, or the like. However, they could be any kind of end-user equipment such as, for example: wired and wireless computing devices, such as printers and desktop and laptop computers; sensors and effectors such as thermometers, thermostats, and lighting controls; alarm systems sensors and annunciators; industrial devices such as manufacturing equipment; retail equipment such as cash registers; and etc., to name a few. These devices connect to a gateway 101 wireless or through cables and/or optical links.

The gateway 101 in turn may be connected via a proprietary network 110 to a service provider head end system 120. The proprietary network 110 may be, for example, a packet network, such as a cable and fiber Internet protocol network, a wireless mobile Internet protocol network, or a combination thereof, etc. The gateway 101 may include a DOCSIS (Data Over Cable Service Interface Specification) compliant device including one or more QAM tuners, for instance. The head end 120 may provide data and media content and security services in a variety of ways. The head end 120 is shown as including an authentication server (AS) 122 and a separate overlay endpoint (OEP) content server 124 connected and affiliated with the AS 122. In FIG. 1 the servers 122 and 124 are shown as separate but communicatively coupled. In practice, for example, the AS 122 and the OEP 124 functions could be implemented on separate computers which are adjacent or remote from each other. Similarly both functions could be run separately or together on a single computer in a single location. The OEP 124 and the AS server 122 are in communication with the gateway 101 via the proprietary network 110.

In the example of FIG. 1, the service provider substantially controls the proprietary network 110 such that, either in the establishment of a connection or subsequent communications between the head end 120 and the gateway 101, there is no need necessarily to encrypt communications back and forth. Any number of end user devices 102(a-c) within facility 100 may connect to gateway 101 without a password, and thereby obtain data services from the head end 120 without the head end 120 or the gateway 101 necessarily having to encrypt and decrypt the traffic.

Figure 2:
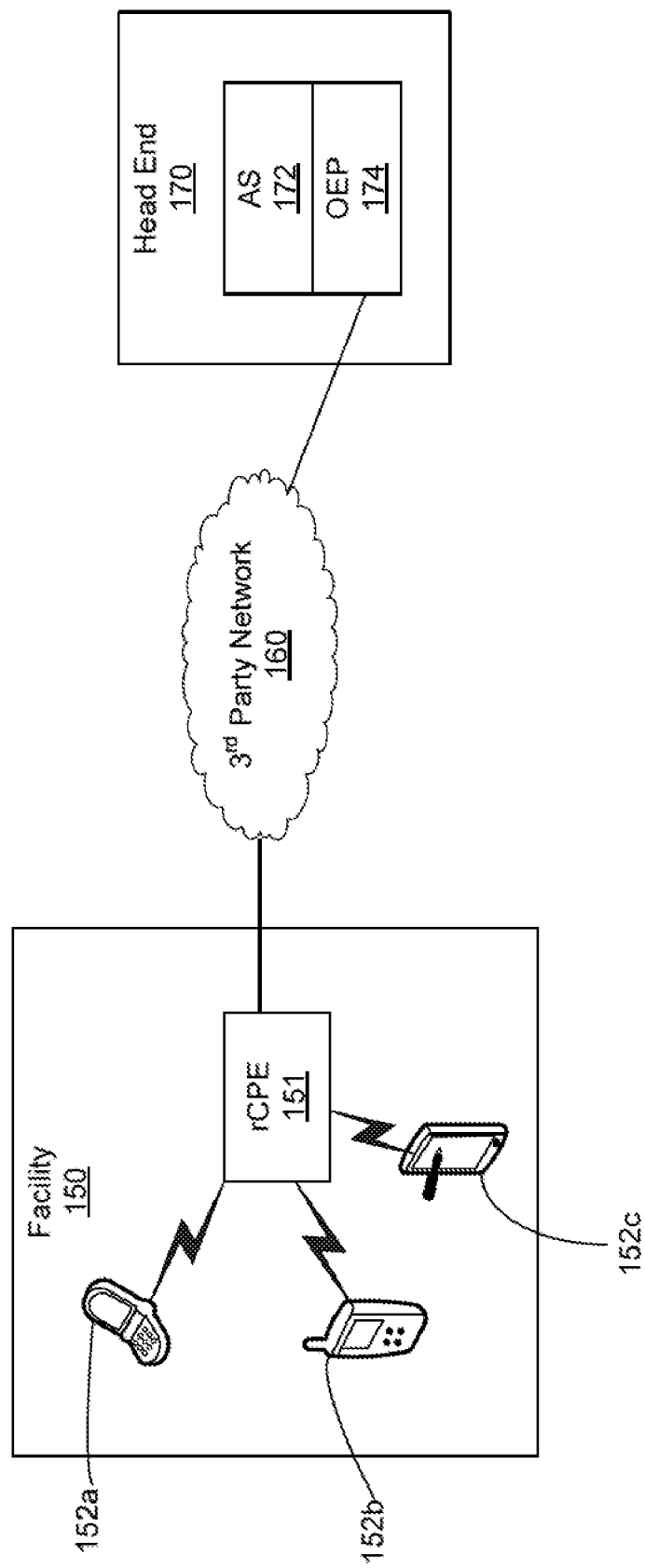
FIG. 2 is a block diagram illustrating an example system using a third-party network.

In contrast to FIG. 1, FIG. 2 shows an example network environment suitable for authenticating system equipment using a non-proprietary third-party network. In a facility 150 there may be a plurality of end user devices 152a, 152b, and 152c. These devices may be any device suitable for sending and receiving data such as Internet data, including, for example, wireless phones, tablet devices, or other devices, as discussed with reference to devices 102(a-c) of FIG. 1. In FIG. 2, the devices 152(a-c) are communicatively coupled to a remote customer premises equipment (rCPE) 151. The coupling may be wireless, as depicted, or wired. The rCPE 151 may be any system or device adapted to communicate data between end user devices 152a-c and the network 160. For example, the rCPE 151 may be a wireless gateway through which user devices 152a-c may communicate with servers outside of the facility 150 to send and receive data via the Internet.

The rCPE 151 may be connected via a third-party network 160 to a service provider head end system 170. The rCPE 151 may be programmed to communicate via the network 160 with head end 170. The third-party network 160 may be, for example, a packet network, such as an Internet protocol network, etc. In an example embodiment, the third party network 160 may traverse a portion of the Internet. The head end 170 may provide content, data, and security services in a variety of ways. In FIG. 2, the head end 170 is shown as including an authentication server (AS) 172 and a separate overlay endpoint (OEP) content server 174 that may be communicatively coupled to, and affiliated with, the AS 172. The OEP 174 and the AS 172 communicate with the rCPE 151 via the proprietary network 160. In FIG. 2, the servers 172 and 174 are shown as separate but communicatively coupled. In practice, for example, the AS 172 and the OEP 174 functions could be implemented on separate computers which are adjacent or remote from each other. Similarly both functions could be run separately or together on a single computer in a single location.

In the example of FIG. 2, the service provider does not control the third-party network 160 such that, either in the establishment of a connection or subsequent communications between the head end 120 and the gateway 101, there may be a threat that the communications could be compromised. While any number of end user devices within facility 150 may connect to gateway 101 without a password, some security must be provided before these devices obtain data services from the head end 170. Otherwise, the head end 170 may not be able to distinguish legitimate requests for service from the rCPE 151 from illegitimate requests received from unauthorized gateways and/or from devices which are able to reach the head end 170 through the third-party network 160.

The head end 170 may include any combination of computing resources suitable for providing services such as, for example, Internet access, to systems such as the rCPE 151 and user devices connected to the rCPE 151. For example, the head end 170 may be part of a head end of a cable communication system.

As shown, the head end 170 comprises the AS 172 communicatively coupled with the OEP 174. The AS 172 may be programmed to perform a series of operations adapted to authenticate remote systems such as the rCPE 151 as described below in connection with FIGS. 5 and 6. The OEP 174 operates as an interface or proxy for communications between the AS 172 and the rCPE 151.

The network 160 may be adapted to communicate data between the rCPE 151 and the head end 170. The network 160 may comprise any network transmission and switching technologies suitable for communicating data between the rCPE 151 and the head end 170. In an example embodiment, the third-party network 160 may be a packet network and may comprise, for example, the Internet. In an example scenario, the network 160 is not controlled by the service provider. Accordingly, head end 170 cannot be certain of the legitimacy of requests from systems attempting to access services controlled by the head end 170.

Figure 3:
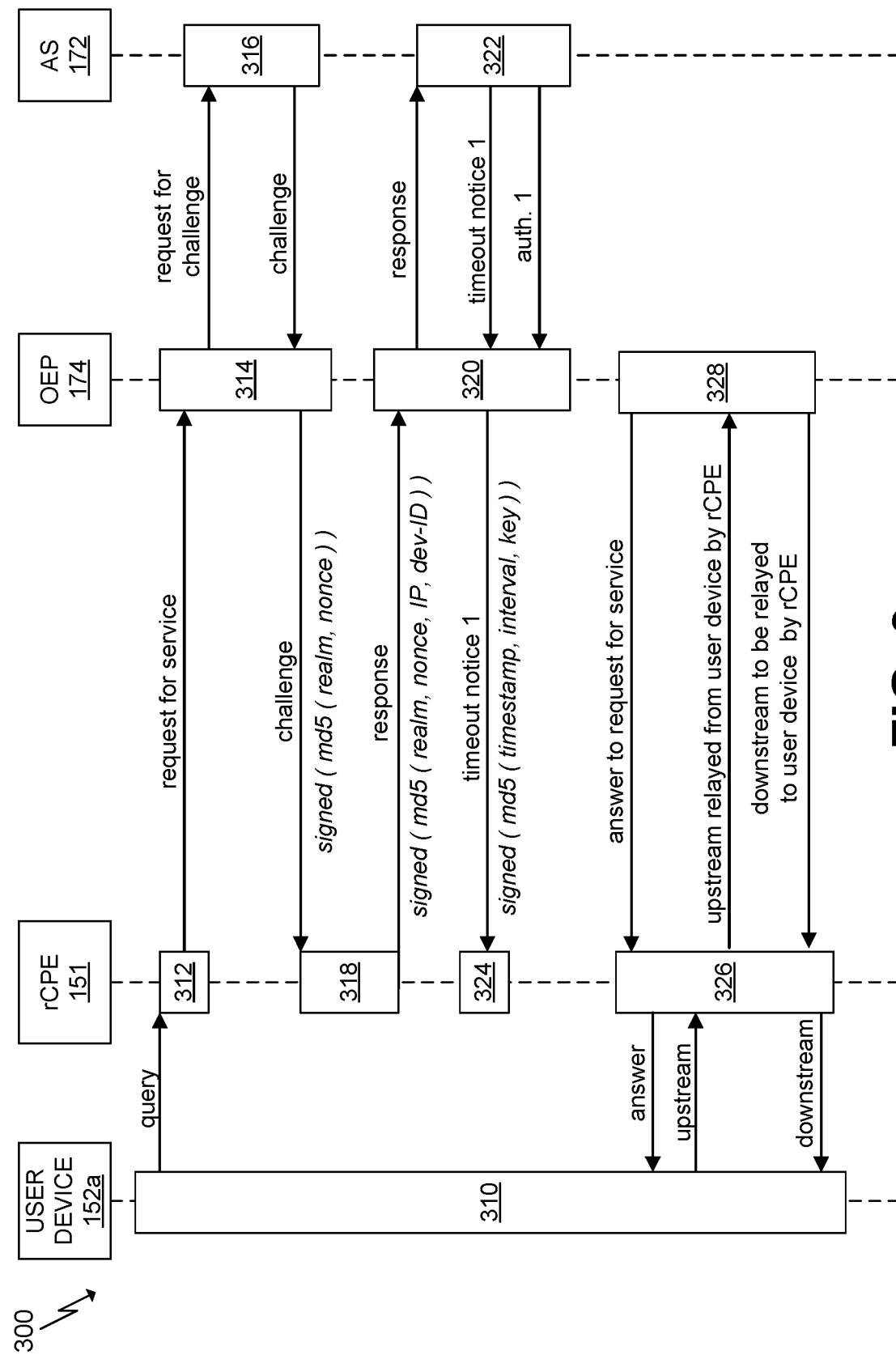
FIG. 3 is a message flow diagram of an example method for authentication and authorization of communications.

FIG. 3 depicts an example method 300 for authenticating a remote processing system. The devices and servers implementing the method 300 are described above in reference to the devices and network shown in FIG. 2. The hardware environments in which those devices and servers may be implemented are described below in reference to FIGS. 5 and 6.

As depicted in FIG. 3, the method 300 begins at a block 310, where the user device 152a may generate and transmit to the rCPE 151 a query that requires use of a service, such as Internet access, to be provided by a service provider.

At a block 312, the rCPE 151 receives the query and responds by generating and transmitting a request for service to the OEP 174, which operates as an endpoint for requesting services from a service provider. Alternatively, the rCPE 151 could start the method 300 by sending a self-generated request for service to the OEP 174, without waiting to receive a query from the user device 152a. The request for service may include identification information, such as a tunnel source IP address, which may be the IP address of the rCPE 151 and/or the user device 152a. The identification information in the request for service may also include a media access control (MAC) address, a universal unique identifier (UUID), or both a MAC address and a UUID of the rCPE and/or the user device 152a. If the MAC address or UUID of the user device 152a may be used, such may be provided to the rCPE 151 in its query sent to the rCPE 151, for example.

At a block 314, the OEP 174 receives the request for service and determines whether the request is currently valid for access to the services of the OEP 174. For example, the OEP may compare the source address of the request to a list of approved devices stored in its memory. If the OEP determines that the request for service is valid, the OEP 174 may provide the requested service as described below in connection with block 328.

If the OEP 174 determines that the received request for service is not currently valid, at a block 314, the OEP 174 may generate and communicate to the AS 172 a request for a challenge. The request for a challenge may include some or all of the information in the request for service that was received from the rCPE 151. For example, the OEP may simply forward the request for service to the AS 172.

At a block 316, the AS 172 receives the request for a challenge and may generate a challenge. The AS 172 then communicates the challenge to the OEP 174. At the block 314, the OEP 174 receives the challenge from the AS 172 and sends the challenge to the rCPE 151.

In the example of FIG. 3, the challenge is shown as incorporating a number of security features. Messages may be secured through any number of a variety of means. For example, the challenge may be signed with a server authentication certificate private-key. Additionally, the challenge may be encrypted using an MD5 algorithm. Further, in an example embodiment, the challenge may contain a realm and a nonce. The realm may be a pre-defined string shared by the rCPE 151 and the AS 172. Generally, a realm may be created or specified by an authentication server to manage services for multiple regions or sets of client devices. The realm may identify, for instance, the computer, system, and/or provider, and as such as may be used to inform the user of the parties or brand involved in providing the connection. The nonce may be a one-time-use random number used to prevent others from spoofing responses to the challenge. Only one response will be accepted to this unique challenge.

The methods implementing these various security functions may be divided between the OEP 174 and the AS 172. For example, the OEP 174 may perform some of the security functions and/or perform other processing to the challenge before sending it. For purposes of discussion, such security features are handled by the AS 172. Accordingly, the processing associated with generating the challenge comprises the AS selecting a realm, creating a nonce, encrypting the message, and signing the message.

At a block 318, the rCPE 151 receives the challenge. The rCPE 151 confirms that the challenge is indeed coming from the AS 172 by examining the digital signature. The rCPE 151 decrypts the challenge using the same MD5 parameters the AS 172 used to encrypt the challenge, and extracts the realm and the nonce.

Next at the block 318, the rCPE 151 formulates a response. The response includes the realm and the nonce. In the example of FIG. 3, the response also includes a tunnel source IP address, which may be the IP address of the rCPE 151 and/or the user device 152a. The response also includes a tunnel source device identifier, which may be a media access control (MAC) address or UUID of the user rCPE 151 and/or the user device 152a. The rCPE 151 encrypts the response using MD5 hashing. The MD5 parameters used for this encryption may be the same as those used by the AS 172 to encrypt the challenge, or they may be distinct. The rCPE 151 signs the response using the device authentication certificate private-key of the rCPE 151. Lastly at a block 318, the rCPE communicates the response to the OEP 174.

At a block 320, the OEP 174 receives the response from the rCPE 151 and forwards the response to the AS 172. The block 320 is optionally a continuation of the block 314.

At a block 322, the AS 172 receives the response. The AS 172 confirms that the response was generated by the rCPE 151 by examining the digital signature. The block 322 may optionally be a continuation of block 316. The AS 172 decrypts the response using the same MD5 parameters that the rCPE 151 used to encrypt the response. The AS 172 then extracts the realm, the nonce, the IP address and the device identifier from the response. The AS 172 uses the nonce to determine that this is the first time this response is being received, and hence the only valid response. The AS 172 checks that the device identifier belongs to a device approved by the service provider for provision of its services. If the rCPE 151 is not an approved device, the AS 172 may take no further action.

The request for service sent by the rCPE 151 at the block 312 and/or the response set by the rCPE at the block 318 may contain a device identifier of the user device 152a in addition to, or in lieu of, the device identifier of the rCPE 151. The inclusion of such information allows the AS 172 in the methods 316 and/or 322 to make decisions about whether to provide particular services via the rCPE 151 to individual user devices. For example, the AS 172 may instruct the OEP 174 to provide: either no service or limited services to unknown user devices; more substantial services to known user devices; and/or premium services to user devices belonging to registered premier users.

If the rCPE 151 and/or the user device 152a are approved devices, at the block 322, the AS 172 may generate a first timeout notice (timeout notice 1) and communicate it to the OEP 174. The first timeout notice may include an interval and a key. An interval specifies the duration of time during which the credentials of the rCPE 151 will be accepted as currently valid by the OEP 174 and/or AS 172. An interval can be expressed in a variety of ways. For example, the interval datum contained in a timeout notice could contain a time at which the acceptance expires. Alternatively, it could contain a timestamp of when acceptance begins and a second datum expressing the length of time that acceptance will last. The key may be a random number generated by the AS 172. Like the nonce, it may be used to uniquely identify proper answers to the timeout notice. The AS 172 MD5 hash encrypts the first timeout notice, and signs it using digital encryption before sending it to the OEP 174. At the block 320, the OEP 174 receives the first timeout notice and communicates it to the rCPE 151.

In response to receiving the first timeout notice, at the block 320 the OEP 174 may also add the source address of the rCPE 151 and/or the user device 152a to its list of approved devices and note the interval during which the approval will last. Alternatively, the OEP 174 may receive such information in a separate authorization message (auth. 1) sent from the AS 172. In either case, at the block 320, the OEP 174 learns that: the AS 172 has accepted the request for service from the rCPE 151; that the OEP 174 may be permitted to provide services to the rCPE 151; and for how long the OEP 174 is permitted to do so.

At a block 324, the rCPE receives the first timeout notice from the OEP 174. Prior to the expiration of the interval, the OEP 174 may provide non-secure services to the rCPE 151. The exchange of unsecured upstream and downstream communication has certain advantages. In contrast to methods using secure tunnels for data interchange, here there is no overhead for the service provider and at the remote systems of encrypting and decrypting all content. Such overhead is particularly onerous for large media data, such as static images found on web sites, and media content such as audio and/or video streams. Here, the AS 172, the OEP 174, and the rCPE 151 bear no burden of security processing for upstream and downstream data packets per se.

For example, in FIG. 3 at a block 328, the OEP 174 may generate and send an answer to the request for service originally sent by the rCPE 151. The block 328 may be a continuation of the block 314 and/or 320. To generate the answer, the OEP 174 may, for instance, retrieve web data from a URL specified by the user device 152a and forward that data to the rCPE 151. Alternatively, the OEP 174 may obtain a stream of media data, or other kinds of data, to be forwarded to the rCPE 151. Unlike the challenge, response, and timeout notice of the remote authentication method, once authentication is completed there is no need to encrypt, sign, or otherwise secure the answer and other upstream and downstream communications between the OEP 174 and rCPE 151.

At a block 326, the rCPE 151 receives the answer and forwards it to the user device 152a. The block 326 is optionally a continuation of the block 324 and/or the block 312. In block 310, the user device 152a finally receives the answer to its original query. For example, the user device 152a may be provided with access to a web site that it had requested.

At this point in the method 300, the rCPE 151 may receive other requests for services from the user device 152a and relay these upstream to the OEP 174. Until the expiration of the interval, the OEP 174 will recognize such requests from the rCPE 151 as authorized by the AS 172. The OEP 174 will honor such requests and provide answers downstream to the rCPE 151, and the rCPE 151 will relay these downstream to user device 152a.

Figure 4:
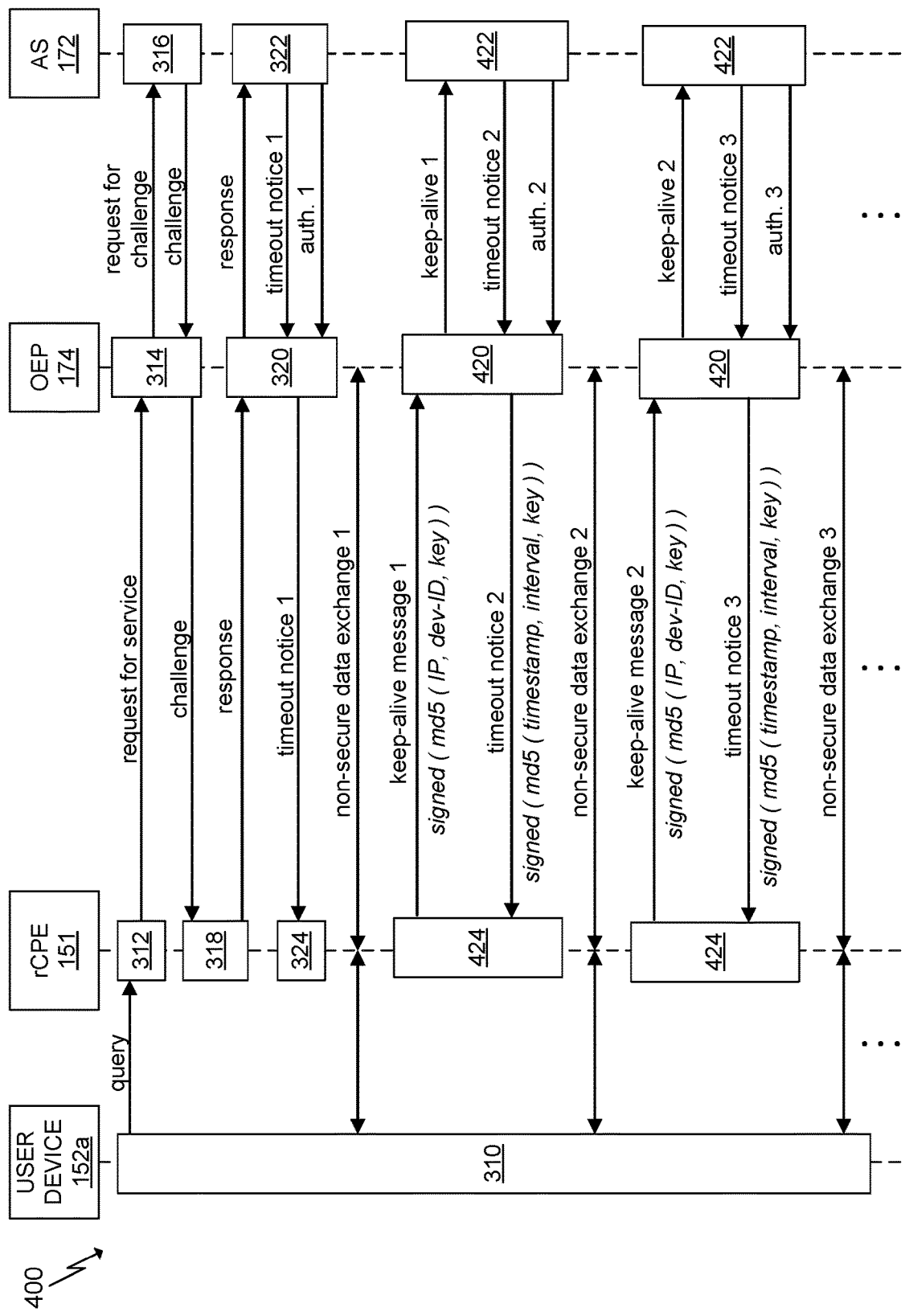
FIG. 4 is a message flow diagram of an example method for keeping an authenticated session alive.

FIG. 4 depicts an example method 400 for authenticating a remote processing system and continuing communication sessions. The method 400 begins as discussed in greater detail above in reference to blocks 312-324 of the method 300 of FIG. 3. Here again in FIG. 4, a user device 152a sends a query for service to an rCPE 151. In response, the rCPE sends a request for service to an OEP 174. In turn, the OEP 174 sends request for a challenge to an AS 172. The AS 172 responds with a secure challenge, and the OEP 174 forwards this challenge to the rCPE 151. The rCPE 151 sends a secure response to the OEP 174, which is evaluated by the OEP 174 and/or the AS 172. If the response is accepted, the AS 172 generates a first timeout notice with a first interval and sends this notice to the OEP 174, which passes it to the rCPE. The AS 172 may also send a separate first authorization notice to the OEP 174 containing parameters describing what services the OEP 174 may provide to the rCPE 151 and/or user device 152a, and on what terms and conditions. After this secure authentication is completed, the rCPE 151 and the OEP may exchange non-secure data as described above in connection with the blocks 326 and 328 of FIG. 3.

In the method 400 of FIG. 4, to continue obtaining services from the OEP 174, the rCPE 151 must send a keep-alive message prior to the expiration of the interval contained in the first timeout notice. At a block 424, the rCPE 151 formulates a first keep-alive message (keep-alive message 1). The block 424 may be a continuation of the block 324 in which the rCPE 151 received the first timeout notice. In the example illustrated in FIG. 4, the keep-alive messages include the key (random number) that was included in the associated timeout notice, as discussed in reference to FIG. 3. The keep-alive messages also include the tunnel source IP address and the tunnel source device identifier. In the example of FIG. 4, at the block 424 the rCPE 151 encrypts the keep-alive messages using MD5 hashing, and signs the keep-alive messages using the device authentication certificate private-key of the rCPE 151. Before the expiration of the interval specified in the first timeout notice, the rCPE 151 communicates the first keep-alive message to the OEP 174.

At a block 420, the OEP 174 receives the first keep-alive message from the rCPE 151 and forwards the first keep-alive message to the AS 172. The block 420 may be a continuation of the block 320. At a block 422, the AS 172 receives the first keep-alive message and confirms that the keep-alive message was generated by the rCPE 151 by examining the digital signature. The block 422 may be a continuation of the block 322. The AS 172 decrypts the first keep-alive message using the same MD5 parameters that the rCPE used to encrypt the first keep-alive message. The AS 172 then extracts the key, the IP address, and the device identifier from the first keep-alive message. The AS 172 uses the key to determine that this is the first time this first keep-alive message is being received, and hence this first keep-alive message is the only valid first keep-alive message in response to the first timeout notice.

The AS 172 checks that the device identifier belongs to a device that is still approved by the service provider for provision of its services. If the rCPE 151 is not an approved device, the AS 172 may take no further action or notify the OEP 174 that it should cease provision of services to the rCPE 151.

If the AS 172 determines that the rCPE 151 remains an approved device, at the block 422, the AS 172 may generate a second timeout notice (timeout notice 2) and communicate it to the OEP 174. The second timeout notice includes a second interval, which may be the same as the first interval in the first timeout notice. The second timeout notice also contains a new key which is preferably a new random number generated by the AS 172. The AS 172 MD5 hash encrypts the second timeout notice, and signs it before sending it to the OEP 174.

At the block 420, the OEP 174 receives the second timeout notice from the AS 172 and communicates it to the rCPE 151. In response to receiving the second timeout notice, the OEP 174 may also add the source address of the rCPE 151 and/or the user device 152a to its list of currently valid devices and notes the interval. Alternatively, the OEP 174 may receive such information from the AS 172 in a second authorization message (auth. 2).

By receipt of the second timeout notice and/or the second authorization at the block 420, and the second interval specified in the second timeout notice, the OEP 174 becomes aware that non-secure communications with the rCPE 151 are now permitted. Non-secure upstream and downstream communications may now proceed as they did between the blocks 326 and 328 of FIG. 3, and continue until the expiration of the second interval.

The exchange of unsecured upstream and downstream messages between the rCPE 151 and the OEP 174 may continue indefinitely by repeating the method of exchanging keep-alive messages and timeout notices as depicted in FIG. 4. To keep the channel open, prior to the expiration of the current interval, the rCPE 151 must send a second keep-alive message (keep-alive message 2) to the OEP 174, which forwards it to the AS 172 for verification. The AS 172 will then generate a new timeout notice, which the OEP 174 will forward to the rCPE 151.

So long as the current interval is not allowed to lapse, the rCPE 151 and OEP 172 may continue to exchange non-secure data. If the interval does expire before a keep-alive message is received, to reinitiate non-secure communications, the AS 172 and OEP 174 may require the rCPE 151 to again answer a challenge. In the example method 400, three exchanges of non-secure data between the rCPE 151 and OEP 174 are depicted, supported by the exchanges of a first, second, and third timeout notice (timeout notice 3) and first and a second keep-alive message. In practice, a fourth exchange of non-secure data could be supported by the rCPE 151 sending a third keep-alive message, etc.

Also, it will be appreciated that non-secure data could be exchanged between the time the rCPE 151 sends a keep-alive message and the time the OEP responds with a next timeout notice, provided the interval of the prior timeout notice has not yet expired.

Figure 5:
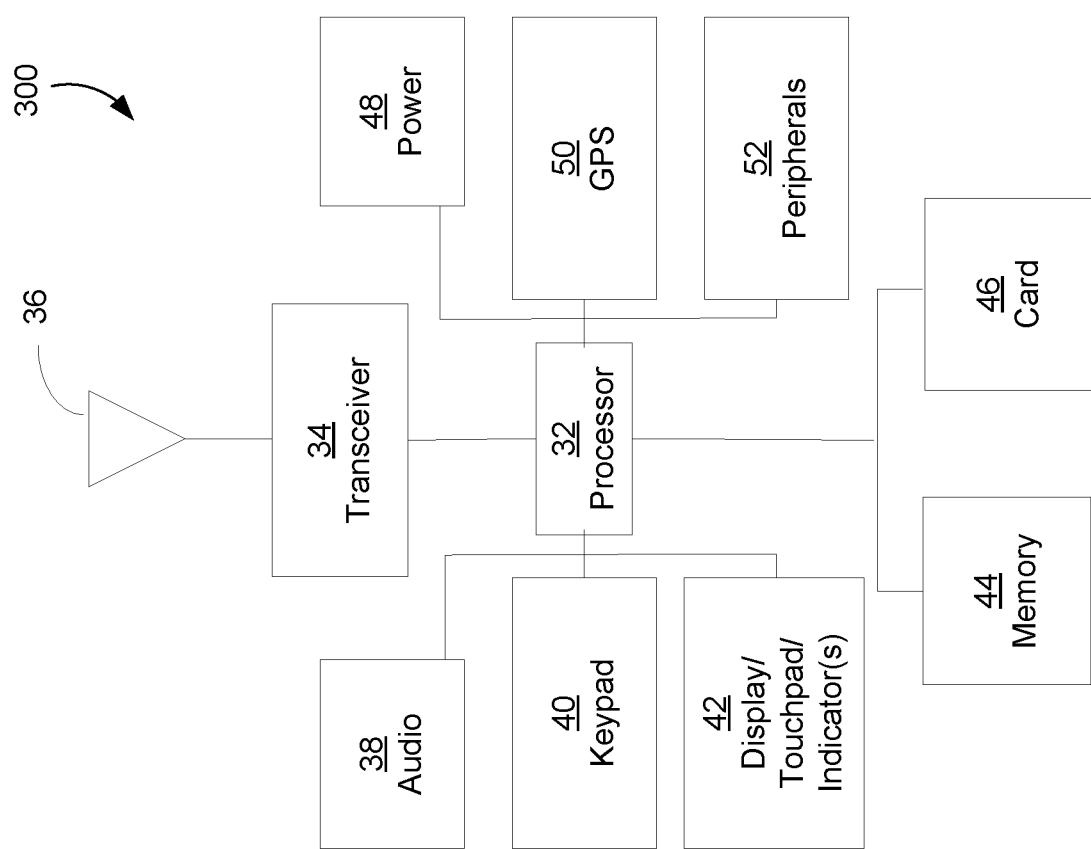
FIG. 5 is a block diagram of an example network device or end user device.

FIG. 5 is a system diagram of an exemplary computing device 300, that may be used to implement a user device such as, for example, user devices 102(a-c) and 152(a-c), or a network device such as the gateway 101 or the CPE 151 depicted in FIGS. 1 and 2. As shown in FIG. 5, the computing device 300 includes a processor 32, a transceiver 34, a transmit/receive element 36, a non-removable memory 44, and a power source 48. The computing device 300 may also include a user interface with audio features 38 (e.g., a speaker and/or microphone), a keypad 40, and/or a display 42. The display 42 may be a touchpad and/or may include one or more indicators such as LEDs. The device 300 may also include a removable memory, such as a memory card 46, and a global positioning system (GPS) chipset 50, and/or other peripherals 522. It will be appreciated that the computing device 300 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the computing device 300 to operate in a wireless environment. The processor 32 may be coupled to the transceiver 34, which may be coupled to the transmit/receive element 36. The processor 32 may perform security operations such as authentication, security key agreement, and/or cryptographic operations, such as at the access-layer and/or application layer for example.

While FIG. 5 depicts the processor 32 and the transceiver 34 as separate components, it will be appreciated that the processor 32 and the transceiver 34 may be integrated together in an electronic package or chip. Similarly, other components, such as the non-removable memory 44, and GPS chipset, for example, may be packaged or integrated with the processor 32 or with each other.

The transmit/receive element 36 may be configured to transmit signals to, and/or receive signals from, a wireless gateway or other customer premises equipment, such as an rCPE. For example, in an embodiment, the transmit/receive element 36 may be an antenna configured to transmit and/or receive RF signals. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the computing device 300 may have multi-mode capabilities. Thus, the transceiver 34 may include multiple transceivers for enabling the computing device 300 to communicate via multiple radio access technologies (RATs), such as UMTS Terrestrial Radio Access (UTRA) and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the computing device 30, such as on a server or a home computer. The processor 32 may receive power from the power source 48, and may be configured to distribute and/or control the power to the other components in the computing device 300. The power source 48 may be any suitable device for powering the computing device 300. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The computing device 300 may contain a device-based authentication certificate and software in its memory 44, or equivalent hardware programming (e.g., in an FPGA), to enable it to function as a gateway, rCPE, or server in methods described herein for the secure establishment and maintenance of channels of unsecured data communication. The computing device 300 may also contain a media access control (MAC) address or universal unique identifier (UUID) which may be stored in, for example, its memory 44, processor 32, or transceiver 34.

FIG. 6 is a block diagram of an exemplary computing system 400 on which, for example, the head end servers of FIGS. 1 and 2 may be implemented. Similarly, the computing system 400 may be suitable for implementing the gateway 101 and the rCPE 151. The computing system 400 may comprise a computer or server and may be controlled primarily by computer readable instructions, which may be in the form of software, wherever, or by whatever means such software may be stored or accessed. Such computer readable instructions may be executed within a central processing unit (CPU) 91 to cause the computing system 400 to perform the desired operations. The CPU 91 may be implemented, for example, as a single-chip microprocessor or comprise multiple processors. An optional coprocessor 81, distinct from the main CPU 91, may perform additional functions or assist the CPU 91.

In operation, the CPU 91 fetches, decodes, and executes instructions, and transfers information to and from other resources via the computer's main data-transfer path, a system bus 80. Such a system bus connects the components in the computing system 400 and defines the medium for data exchange. The system bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include a random access memory (RAM) 82 and a read only memory (ROM) 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates methods within the system and isolates system methods from user methods. Thus, a program running in a first mode can access only memory mapped by its own method virtual address space; it cannot access memory within another method's virtual address space unless memory sharing between the methods has been set up.

In addition, the computing system 400 may contain a peripherals controller 83 responsible for communicating instructions from the CPU 91 to peripherals, such as a printer 94 and a disk drive 85, as well as a user interface input keyboard 84 and mouse 95.

A user interface display 86, which may be controlled by a display controller 96, may be used to display visual output generated by the computing system 400 as well as to provide a mechanism to aid a user in providing input to the computing system 400. Visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that may be sent to the display 86.

Further, the computing system 400 contains a network adaptor 97 that may be used to connect computing system 400 to other devices or to an external communications network, such as networks 110 and 160. The computing system 400 may also have a wireless transmit/receive element 99 analogous to the transmit/receive element 36 of the computing device 300, whereby the computing system 400 may connect to wireless devices and networks.

The computing system 400 may contain a device-based authentication certificate and software in its memory (e.g., RAM 82, ROM 93, or disc 85), or equivalent hardware programming (e.g., in an FPGA), to enable it to function as a gateway, rCPE, or server in methods described herein for the secure establishment and maintenance of channels of unsecured data communication. The computing system 400 may also contain a media access control (MAC) address or universal unique identifier (UUID) which may be stored in, for example, its memory, CPU 91, or network adapter 97.

It will be appreciated that while illustrative embodiments have been disclosed, the scope of potential embodiments is not limited to those explicitly described. For example, while the concepts are described with reference to particular user interfaces, the envisioned embodiments extend to any user interfaces that may be suitable for performing the described linking functions. Likewise, while particular networking, encryption, and authentication are referred to, any network communication and security technologies may be used and still fall within the scope of envisioned embodiments.

Each of the methods, processes, and algorithms described in the preceding sections may be embodied in, and fully or partially automated by, code modules executed by one or more computers or processors. The code modules may be stored on any type of computer-readable medium or computer storage device, such as hard drives, solid state memory, optical disc, and/or the like. The methods and algorithms may be implemented partially or wholly in application-specific circuitry. The results of the disclosed methods and method steps may be stored, persistently or otherwise, in any type of non-transitory computer storage such as, e.g., volatile or non-volatile storage.

The various features and methods described above may be used independently of one another, or may be combined in various ways. All possible combinations and subcombinations are intended to fall within the scope of this disclosure. In addition, certain method or method blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method comprising:
   receiving, by a first computing system, a request to authenticate a network device;
   sending, by the first computing system and to the network device, a challenge message;
   receiving, by the first computing system and from the network device, a response to the challenge message, wherein the response comprises a digital signature of the network device;
   determining, by the first computing system and based on the response, that the network device is permitted to transmit non-secure data between a second computing device and a user device; and
   sending, to the network device and based on the determining, information indicating the permission.

2. The method of claim 1, further comprising:
   sending, by the first computing system and to the network device, a timeout notice that comprises an indication of a time interval;
   receiving, prior to the expiration of the indicated time interval and from the network device, a keep-alive message; and
   sending, by the first computing system and to the network device, information indicating the permission is continued.

3. The method of claim 2, wherein the response and the keep-alive message are signed using a second authentication certificate, and wherein the method further comprises:
   determining, by the first computing system, that the network device is not permitted to transmit non-secure data between the second computing device and the user device if the second authentication certificate is not recognized.

4. The method of claim 1, wherein the challenge message comprises a realm and a nonce, and wherein the method further comprises determining that the network device is not permitted to transmit non-secure data between the second computing device and the user device if the response does not comprise the realm and the nonce.

5. The method of claim 1, further comprising signing, by the first computing system using a first authentication certificate, the challenge message.

6. The method of claim 1, wherein the response comprises an identifier of the network device, and wherein the identifier comprises one of an Internet protocol source address, a media access control address, or a universal unique identifier.

7. The method of claim 1, wherein the first computing system comprises at least one of a content server or an authentication server.

8. An apparatus comprising:
one or more processors; and
a memory, the memory storing computer-executable instructions that, when executed by the one or more processors, cause the apparatus to:
receive a request to authenticate a network device;
send, to the network device, a challenge message;
receive, from the network device, a response to the challenge message, wherein the response comprises a digital signature of the network device;
determine, based on the response, that the network device is permitted to transmit non-secure data between a second computing device and a user device; and
send, to the network device and based on the determining, information indicating the permission.

9. The apparatus of claim 8, wherein the computer-executable instructions further cause the apparatus to:
send, to the network device, a timeout notice that comprises an indication of a time interval;
receive, prior to the expiration of the indicated time interval and from the network device, a keep-alive message; and
send, to the network device, information indicating the permission is continued.

10. The apparatus of claim 9, wherein the response and the keep-alive message are signed using a second authentication certificate, and wherein the computer-executable instructions further cause the apparatus to:
determine that the network device is not permitted to transmit non-secure data between the second computing device and the user device if the second authentication certificate is not recognized.

11. The apparatus of claim 8, wherein the challenge message comprises a realm and a nonce, and wherein the computer-executable instructions further cause the apparatus to determine that the network device is not permitted to transmit non-secure data between the second computing device and the user device if the response does not comprise the realm and the nonce.

12. The apparatus of claim 8, wherein the computer-executable instructions further cause the apparatus to sign, using a first authentication certificate, the challenge message.

13. The apparatus of claim 8, wherein the response comprises an identifier of the network device, and wherein the identifier comprises one of an Internet protocol source address, a media access control address, or a universal unique identifier.

14. The apparatus of claim 8, wherein the apparatus comprises at least one of a content server or an authentication server.

15. A computer-readable storage medium having stored thereon computer executable instructions, which when executed by one or more processors, cause:
receiving a request to authenticate a network device;
sending, to the network device, a challenge message;
receiving, from the network device, a response to the challenge message, wherein the response comprises a digital signature of the network device;
determining, based on the response, that the network device is permitted to transmit non-secure data between a second computing device and a user device; and
sending, to the network device and based on the determining, information indicating the permission.

16. The computer-readable storage medium of claim 15, wherein the computer-executable instructions further cause:
sending, to the network device, a timeout notice that comprises an indication of a time interval;
receiving, prior to the expiration of the indicated time interval and from the network device, a keep-alive message; and
sending, to the network device, information indicating the permission is continued.

17. The computer-readable storage medium of claim 16, wherein the response and the keep-alive message are signed using a second authentication certificate, and wherein the computer-executable instructions further cause:
determining that the network device is not permitted to transmit non-secure data between the second computing device and the user device if the second authentication certificate is not recognized.

18. The computer-readable storage medium of claim 15, wherein the challenge message comprises a realm and a nonce, and wherein the computer-executable instructions further cause determining that the network device is not permitted to transmit non-secure data between the second computing device and the user device if the response does not comprise the realm and the nonce.

19. The computer-readable storage medium of claim 15, wherein the computer-executable instructions further cause signing, using a first authentication certificate, the challenge message.

20. The computer-readable storage medium of claim 15, wherein the response comprises an identifier of the network device, and wherein the identifier comprises one of an Internet protocol source address, a media access control address, or a universal unique identifier.

* * * * *